Sept. 20, 1960 A. E. GRAY ET AL 2,953,370

CARD PROCESSING APPARATUS

Filed April 13, 1959 5 Sheets-Sheet 1

INVENTORS:
Alfred E. Gray
Herman J. Malin
Harold B. Thompson

By Smyth & Roston
Attorneys,

Sept. 20, 1960 A. E. GRAY ET AL 2,953,370

CARD PROCESSING APPARATUS

Filed April 13, 1959 5 Sheets-Sheet 2

INVENTORS:
Alfred E. Gray
Herman J. Malin
Harold B. Thompson

By Smyth & Roston

Attorneys

CARD PROCESSING APPARATUS

Filed April 13, 1959 5 Sheets-Sheet 3

INVENTORS:
Alfred E. Gray
Herman J. Molin
Harold B. Thompson

By Smyth & Roston
Attorneys

INVENTORS:
Alfred E. Gray
Herman J. Malin
Harold B. Thompson
By Smyth & Roston
Attorneys Sept. 20, 1960 A. E. GRAY ET AL 2,953,370

CARD PROCESSING APPARATUS

Filed April 13, 1959 5 Sheets-Sheet 5

INVENTORS:
Alfred E. Gray
Herman J. Malin
Harold B. Thompson

By Smyth & Roston

Attorneys 2,953,370

CARD PROCESSING APPARATUS

Alfred E. Gray and Herman J. Malin, Culver City, and Harold B. Thompson, Playa Del Rey, Calif., assignors to Magnavox Company, Los Angeles, Calif., a corporation of Delaware Filed Apr. 13, 1959, Ser. No. 805,912
15 Claims. (Cl. 271—4)

The present invention relates to card processing apparatus in which information storage cards are processed, and it relates more particularly to an improved card feeding-stacking station for use in such apparatus.

In card processing systems of the type with which the apparatus of the present invention is concerned, information is stored on a plurality of separate cards. These cards may then be automatically sorted, merged, collated or otherwise treated, as the occasion requires.

The information may conveniently be recorded on the cards in accordance with a binary code, or other recording codes may be used. When a binary code is utilized, the information may be arranged in rows and columns of binary bits. The bits then represent either binary "1" or binary "0," and each column of bits may be considered as providing a "position" on the individual cards. Each of these positions represents, for example, a multi-digit binary number.

The binary bits may be recorded on the cards in the form of magnetic areas, with a north pole representing binary "1," for example, and with a south pole representing binary "0." Alternately, the binary bits can be represented by the presence or absence of holes in the cards, in the form of black and white markings, or in any other appropriate form. In the following description, magnetic recordings will be described with appropriate electro-magnetic transducers being used to transform the recordings into electrical signals. It is apparent that if other types of recordings are used, transducers appropriate to those types of records will replace the electro-magnetic transducers of the ensuing description.

The more complex data processing systems often use many millions of binary bits to store the pertinent information required for such systems. These bits, in turn, require a large number of cards in the card processing systems of the type with which the present invention is concerned. The cards may conveniently be stored in magazines which, in turn, may be racked in suitable files. For processing purposes, a magazine is selected (either automatically or manually) and placed in a feeding-stacking station in the card processing apparatus.

The feeding-stacking station referred to in the preceding paragraph holds the cards in a stacked condition, and the station includes a mechanism for feeding the cards in sequence to a transport medium. The transport medium, for example, may be a rotatable vacuum pressure drum which will be described, and which exerts a vacuum pressure at its peripheral surface. Such a drum is described and claimed, for example, in copending application Serial No. 600,975 which was filed July 30, 1956 in the name of Loren R. Wilson, now Patent No. 2,883,189.

The vacuum pressure rotatable transport drum referred to above is capable of receiving the cards from the feeding-stacking station and of carrying the cards at fixed positions on its peripheral surface. However, it will become evident that other types of movable or stationary transport media may be used for carrying the cards away from the feeding-stacking station with which the present invention is concerned.

The cards from the feeding-stacking station of the invention may be carried in sequence by the transport medium past appropriate transducer heads for processing purposes. This processing may involve the control of a card sorting operation, or merging operation, and the like. Moreover, the processing may involve the reading of information on the successive cards into appropriate output units, or the recording of new information on the cards from appropriate input units.

Upon the completion of the processing operation, the cards are returned to the original feeding-stacking station, or to other similar stations, by the transport medium. It is clear that such an operation requires that the station be capable of being operated in a feeding mode in which cards are fed out of it to the transport medium, or in a stacking mode in which cards are stripped from the transport medium and deposited in the station.

Reversible card feeding-stacking stations of the type mentioned in the preceding paragraph are described and claimed, for example, in copending application Serial No. 538,111 which was filed October 3, 1955 in the name of Robert M. Hayes et al., now Patent No. 2,842,362. The apparatus described in the Hayes application permits the card processing apparatus to be simplified to a large extent and also permits an increased flexibility in the operation of the system.

The feeding-stacking station of the Hayes application enables the information storage cards to be fed from a particular feeding-stacking station to the transport medium for processing, and then to be returned to the same station after the processing has been completed. This operation may be completely automatic. Moreover, such reversible stations permit a convenient interchange of cards back and forth between two or more such stations for collating, sorting or other purposes.

The reversible feeding-stacking station of the Hayes application uses mechanical linkage and mechanically operated members to accomplish its dual feeding-stacking function. Copending application Serial No. 645,639, filed March 12, 1957 in the name of Alfred M. Nelson, provides a reversible station of the type under discussion. However, the Nelson station utilizes pneumatic means, rather than the mechanical linkages of the Hayes application, to retain the cards in the station and to control the feed of the cards from the station to the transport medium.

The reversible station of the Nelson application includes a vacuum pressure feed head which is cam-operated to an operating position when the station is in its feeding mode and to a stand-by position when the station is in its stacking mode. The station of the Nelson application also includes a stack head. This latter head is moved by the cam to a stand-by position when the station is in its feeding mode, and it is moved to an operative position when the station is in its stacking mode.

As mentioned before, it is usual to hold the cards in a stacked condition in the feeding-stacking stations of the type with which the present invention is concerned. Because of the relatively large number of cards used in most present day data processing systems, it is important from a time standpoint that the cards be moved in and out of the station at a high rate of speed and that a large number of cards be stacked in the station.

It has been found that there may occasionally be a tendency for the cards to jam as they are deposited into the feeding-stacking station from the transport medium during stacking mode operation. There is also a tendency for the cards to stick together and jam in the feed throat of the station during feeding mode operation as they are fed from the station to the transport medium. The jamming conditions have been found to become more prevalent when large numbers of cards are fed in and out of the feeding-stacking station, and when the feeding or stacking is carried out at a relatively high rate of speed.

The cause for jamming of the cards as they are being stacked in the feeding-stacking station during stacking mode operations results from the fact that the cards already in the station bear against those being deposited into the station. This forces the latter cards against the surface of the transport medium. This, in turn, causes subsequent cards to have a tendency to be arrested by the preceding cards, while the subsequent cards are still displaced from the mouth of the station. Such subsequent cards are therefore prevented from being deposited in the station, and they then arrest further cards on the transport medium. This cumulative action results in an aggravated jammed condition.

Copending application Serial No. 685,590, filed May 13, 1957 in the name of Alfred E. Gray et al., now Patent No. 2,908,209 describes and claims a feeding-stacking station which includes a rotatable card-assist element. This rotatable assist element engages the trailing edges of the information storage cards as they are deposited into the station, and as they are fed from the station. The rotatable assist element continually moves the trailing edges of the cards away from the periphery of the transport medium as the cards are being deposited in the feeding-stacking station.

The rotatable assist element of the copending application thereby serves to maintain the cards in the feeding-stacking station at the proper approach angle to the transport medium during the stacking mode operation. This permits each subsequent card to move completely across the mouth of the station before it is arrested by the stack head. This action precludes any possibility of jamming of the cards when the station is in its stacking mode, and it permits the cards to be successively fed into the station.

As mentioned previously, it has also been found that when the feeding-stacking station is conditioned to a feeding mode, and when a relatively large number of cards are stacked in the station, there also is a tendency for the cards to jam. This latter tendency is due to the pressure of the cards in the station tending to force the leading card out of proper alignment with the throat of the station through which that card must pass to leave the station. The rotatable assist element of the copending Gray application has also been found to alleviate this latter condition, when the element is placed in a position to flex or riffle the trailing edges of the leading cards in the station, so as to relieve the load of the entire stack from the front card, and so as to prevent any tendency for the cards to stick together.

However, it has been found that the relative positions between the cards and the rotatable assist element to prevent jamming during the stacking mode of the station is different from the required relative positions to prevent jamming during the feeding mode. That is, the cards and the rotatable assist element must be relatively closer together during the stacking mode in order to prevent positively the jamming situation described above. However, when the relative positions of the cards and the rotatable element are proper for optimum stacking assist operation, it has been found that the element and the cards are relatively too close together to permit proper successive feed of the cards from the station to the transport medium during the feeding mode.

Copending application Serial No. 764,066 which was filed September 29, 1958 in the name of Eric Azari et al. discloses and claims a feeding-stacking station of the type under discussion and which includes a rotatable assist element for preventing jamming of the cards when the station is in its feeding mode and when the station is in its stacking mode. The station of the Azari application includes a single rotatable element which is continuously rotated and which is mechanically coupled to the linkage which controls the feed head and the stack head. The construction of the Azari apparatus is such that the rotatable assist element assumes a first position during the stacking mode of the station to provide optimum anti-jamming action for the stacking mode, and the assist element assumes a second position during the feeding mode of the station for optimum anti-jamming action during the feeding mode.

The apparatus described in the Azari application has been constructed and has been found to operate with a high degree of satisfaction. However, the linkage associated with the rotatable element of the Azari station is somewhat complicated. An important feature of the present invention is the provision of a means for modifying the relative positions of the cards and the rotatable assist element in a feeding-stacking station for the purposes described in the preceding paragraphs. However, this change in relative positions is achieved in a relatively simple manner, and without the need for extraneous and relatively complicated linkage and coupling mechanisms.

In accordance with the present invention, a feeding-stacking station is provided which includes an anti-jam rotatable assist element, this element having a fixed position with respect to the station itself. The fixed position of the rotatable assist element corresponds to that position which provides optimum anti-jam action when the station is in its feeding mode. The station of the present invention is constructed so that when the station is in its stacking mode, the stack head moves from its stand-by position to its operative position. Moreover, when the stack head associated with the station of the invention is in its operative position, it moves slightly beyond the adjacent one of the guide rails of the station effectively to shift the cards towards the rotatable element, the cards are so shifted from the position which they assumed during the feeding mode of the station to a new position. The cards assume their new position during the stacking mode which is such that the relative positions between the cards and the rotatable element are correct for optimum anti-jam action during the stacking of the cards. As will be described, a ramp may be provided on the stack head to assist in the smooth flow of cards into the station past the face of the stack head during the stacking mode.

Other features and advantages of the invention will become apparent upon a consideration of the following specification when taken in conjunction with the accompanying drawings in which:

Figure 1 is a top plan view of a simplified data processing system utilizing the apparatus of the invention and illustrating in somewhat schematic form a pair of reversible feeding-stacking stations disposed contiguous to a rotatable transporting drum and adapted to feed information cards to the drum for subsequent processing, and to receive processed cards from the drum;

Figure 2 is a perspective view of a reversible feeding-stacking station constructed to incorporate the teachings of the invention and showing particularly the manner in which a rotatable assist wheel is positioned adjacent one guide rail of the station and the constructional details of a stack head positioned adjacent the other guide rail and which is constructed to extend into the station in a manner to be described;

Figure 3 is a further view in perspective and on an enlarged scale of the stack head used in the embodiment of the invention to be described, this view particularly showing the manner in which the stack head is formed and also illustrating a guide ramp which is affixed to the stack head to assist in the smooth guiding of the cards into the station from the face of the stack head when the station is in its stacking mode;

Figure 2:
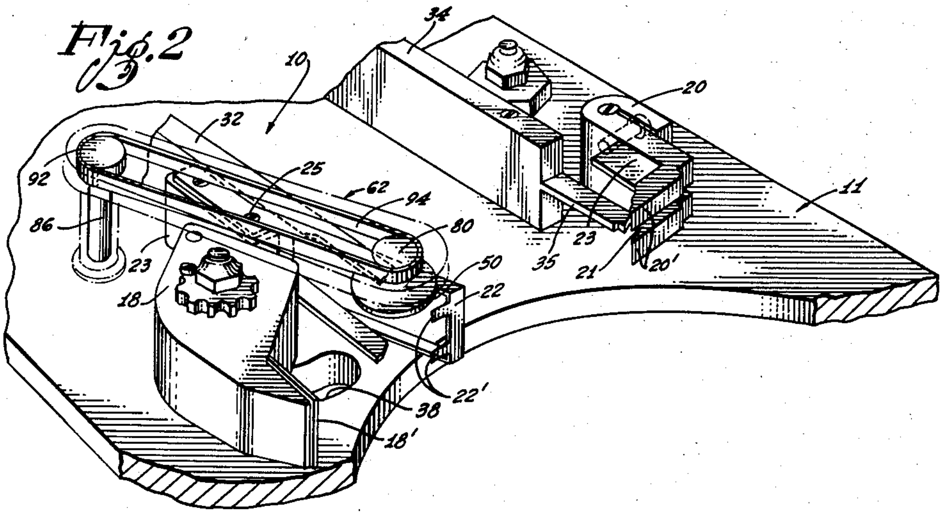
Figure 8:
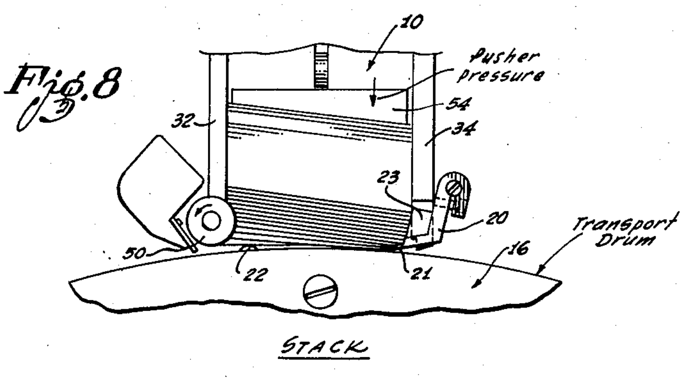
Figure 9:
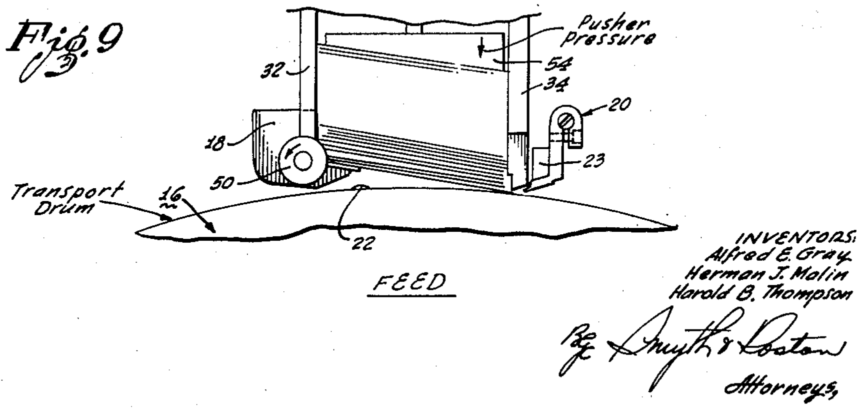
Figure 5:
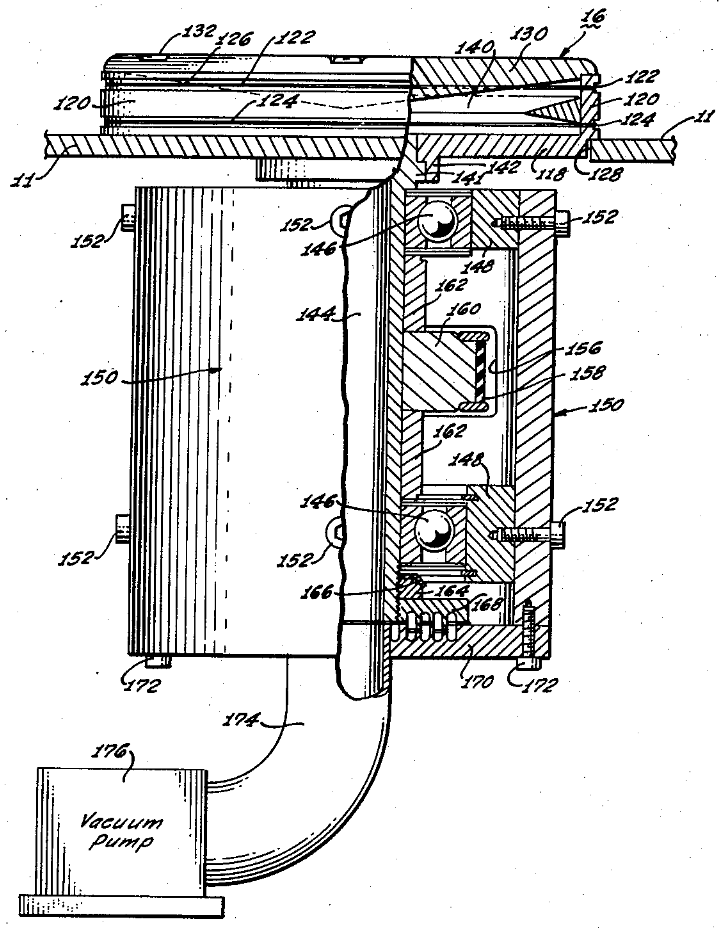
Figure 5 is a sectional view substantially on the line 5—5 of Figure 1 and showing the constructional details of the rotatable vacuum pressure transport drum of Figure 1, this drum serving as a transport medium for the cards and exerting a vacuum pressure at its peripheral surface to securely hold the cards on that surface.
Figures 6, 7:
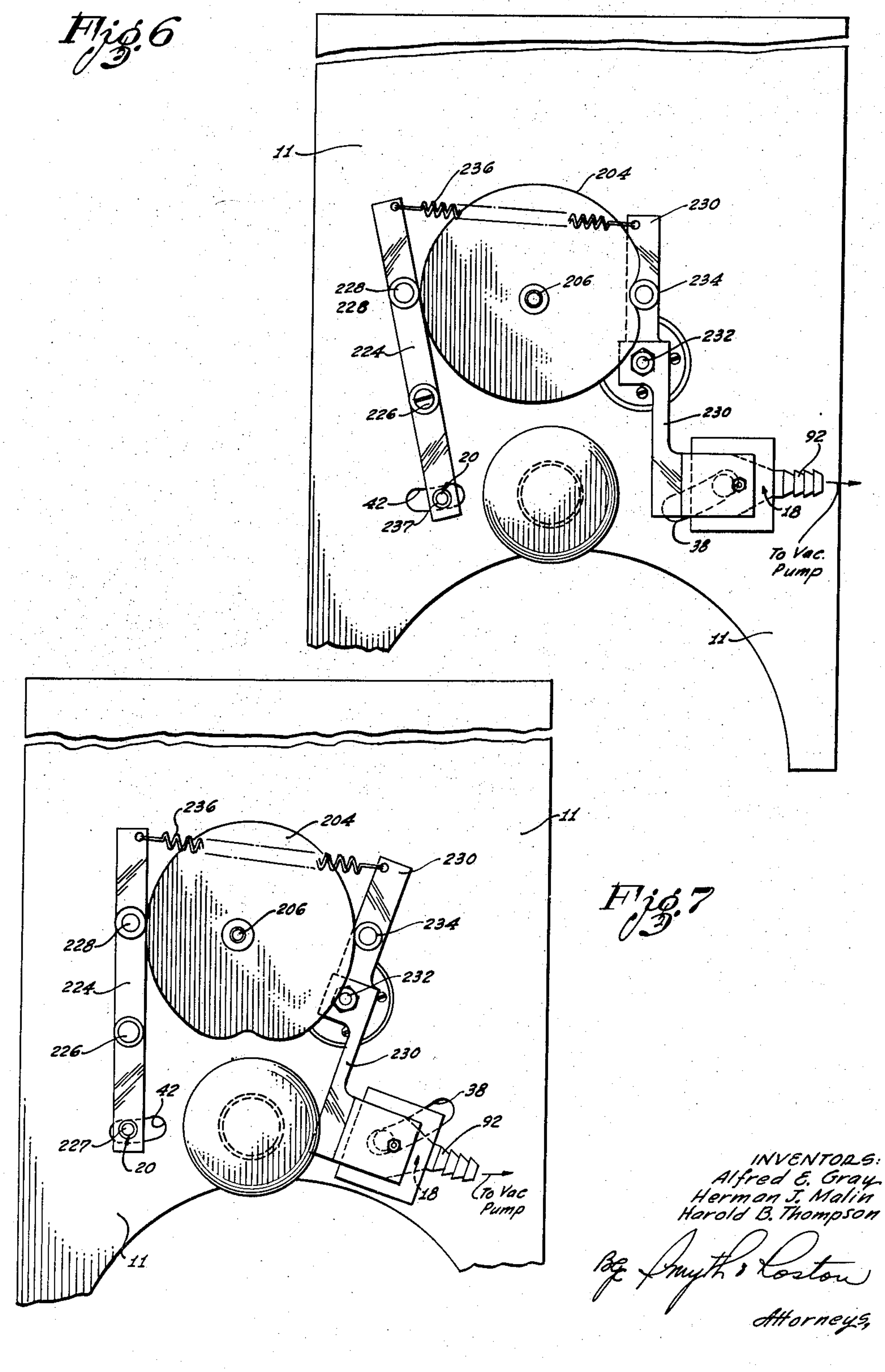

Figures 6 and 7 are bottom views of the reversible station of Figure 2 to show an appropriate control for actuating the station to its feeding mode or to its stacking mode, the station being controlled to its stacking mode when the control mechanism is in the position shown in Figure 5 and being controlled to its feeding mode when the control is in the position shown in Figure 6; and Figures 8 and 9 are somewhat schematic fragmentary views illustrating the manner in which the cards are stacked in the station from the transport drum (Figure 8) under the assistance of the rotatable assist wheel, and the manner in which the rotatable wheel assists in the feeding of the cards from the station to the drum (Figure 9).

Figure 1:
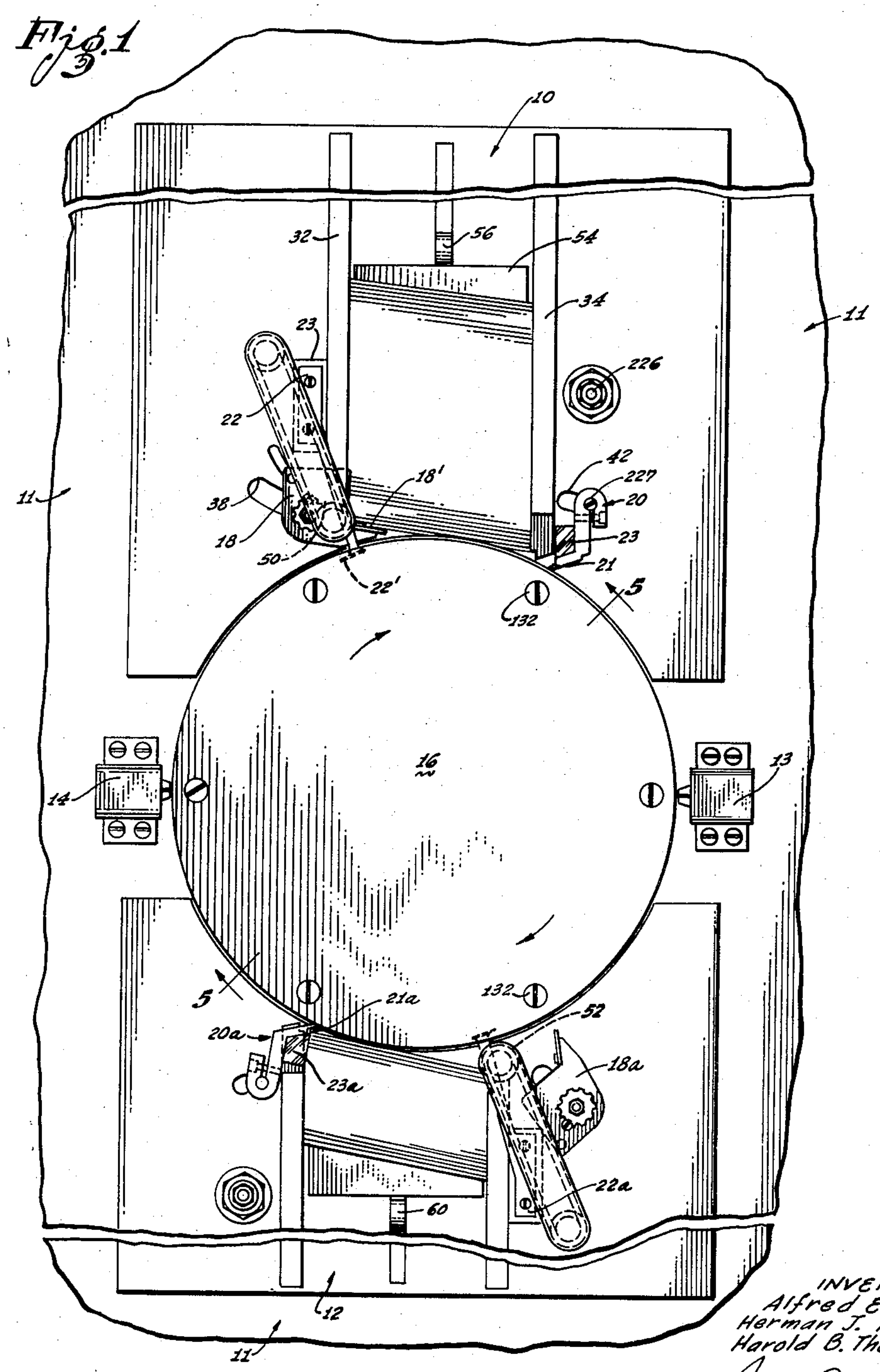

In the simplified apparatus illustrated in Figure 1, a rotatable vacuum pressure drum 16 is mounted on a horizontal table top 11 for clockwise rotation about a vertical axis. The drum is constructed in a manner to be described so that it may exert a vacuum pressure at its peripheral surface. This vacuum pressure, as noted above, enables the drum firmly to retain the information storage cards at fixed angular positions about its periphery so that these cards may be transported by the drum.

A first reversible feeding-stacking station 10 is mounted on the table top 11 with its mouth in contiguous relationship with the peripheral edge of the drum 16. A second reversible feeding-stacking station 12 is also mounted on the table top 11, and the second station is positioned diametrically opposite to the station 10. The reversible station 12 also has its mouth disposed in contiguous relationship with the drum 16.

A first transducer means 13 is mounted on the table top 11, and this transducer means is positioned between the reversible stations 10 and 12. A second transducer means 14 may also be mounted on the table top 11, and the second transducer means is positioned on the opposite side of the drum 16 from the transducer means 13. The transducer means 13 and 14 may be any suitable and well known type of electro-magnetic type of transducer head, or plurality of electro-magnetic transducer heads when magnetic recordings are used on the cards. For example, the electro-magnetic transducer means 13 and 14 may be constructed in a manner similar to that described in copending application Serial No. 550,296 filed December 1, 1956, in the name of Alfred M. Nelson et al.

The feeding-stacking station 10 has a vacuum pressure feed head 18 movably mounted adjacent its guide rail 32, this guide rail being a leading guide rail with respect to the rotation of the drum 16. The station 10 also has a stack head 20 which is movably mounted adjacent its trailing guide rail 34. The construction and operation of the feed head 18 and of the stack head 20 may be similar to that described in copending application Ser. No. 645,639 referred to above. It is believed unnecessary to include a detailed description of the constructional details of these heads in the present application.

It should be pointed out, however, that the feed head 18 is controlled to exert a vacuum pressure at its surface 18' when the transfer mechanism of the station 10 is in its feeding mode with the feed head at its operative position. This vacuum pressure is exerted on the trailing portion of the leading card in the station 10. The same leading card rests on the peripheral surface of the drum 16, and the drum also exerts a vacuum force on the card. The stack head 20 is withdrawn to its stand-by position at this time when the station is in its feeding mode.

The force exerted by the peripheral surface of the drum 16 tends to withdraw the leading card from the station 10, whereas the force exerted by the feed head 18 tends to retain the card in the station. The force exerted by the head 18 is made the greater of the two so that it is able to overcome the force exerted by the drum 16. As long as the leading card in the station is held in this manner, the other cards supported in stacked relationship in the station behind the leading cards are also held between the guide rails 32 and 34. The cards are so held in the station in an upright generally stacked relationship between the guide rails, with the lower edges of the cards resting on the floor of the station which, in turn, is supported on the table top 11.

Whenever the vacuum pressure to the feed head 18 is momentarily interrupted, however, the leading card in the station is withdrawn through a throat formed by the space between the end of the guide rail 34 and the drum and out of the station. The interval of the interruption in the vacuum pressure to the feed head 18 is conveniently made such that only one card at a time can be released from the station through the throat to the periphery of the drum 16. For this purpose, the width of the throat is made just greater than the thickness of a single card, but less than the thickness of two cards. The next card in the station now comes into the leading position, and it is retained in the station by the vacuum pressure of the feed head 18, and it is so held until the next interruption of that vacuum pressure.

In the second or stacking mode of the feeding-stacking station, the feed head 18 is withdrawn to its stand-by position and its vacuum pressure is turned off. The stack head 20 is simultaneously moved to its stacking position in substantial engagement with the drum. When the station is in its stacking mode, any card transported by the drum to the mouth of the station 10 is arrested by the stack head 20.

In the apparatus illustrated in Figure 1, the station 10 is illustrated as being in its feeding mode, and the station 12 is illustrated as being in its stacking mode. It will be observed, that when a station is in its feeding mode, its feed head is moved forward to an operative position and the stack head is withdrawn to a stand-by position. Conversely, when a station is in a stacking mode, its stack head is moved forward to an operative position and its feed head is withdrawn to a stand-by position.

A pick-off member 22 is mounted adjacent the leading guide rail 32 of the card holder 10. This pick-off member has a series of fingers 22' which extend into peripheral grooves in the drum 16, and the stack head 20 has fingers 20' (Figure 2) which also extend into these grooves. The fingers 22' of the pick-off member are shaped radially outward with respect to the periphery of the drum 16 so that the cards transported by the drum ride over the fingers and are lifted outwardly from the periphery of the drum.

Therefore, each card arrested by the stack head 20 has its trailing edge projecting over the fingers 22' of the pick-off. The succeeding card transported by the drum 16 rides up over the fingers 22' and under the preceding card so as to pry the preceding card from the periphery of the drum. The succeeding card is also stopped by the stack head 20, and the preceding card is deposited in the card holder 10. In this manner, the apparatus is conditioned to its second or stacking mode in which cards transported by the drum 16 are stacked in the station 10.

Therefore, the dual feeding-stacking station described above has two operational modes. In the first or feeding mode, the cards are held in stacked relationship in the station, and such cards may be controllably and successively fed to the peripheral surface of the drum 16. In the second or stacking mode, the cards transported by the periphery of the drum are stripped from that periphery and are deposited in the station.

The feeding-stacking station 12 may also have a feed head 18a associated with its leading guide rail, and it may also have a stack head 20a associated with its trailing guide rail. The station 12 may also have a pick-off 22a mounted adjacent the feed head 18a. The feed head 18a and the stack head 20a may be similar in their construction and operation to the corresponding heads 18 and 20 associated with the station 10. Likewise, the pick-off 22a may be similar to the pick-off 12.

In its feeding mode of operation, the station 10 may contain a plurality of information storage cards in stacked relationship, as mentioned above. In that mode, the transfer mechanism of the station is conditioned for controllably feeding the cards to the peripheral surface of the drum 16. The station 12 at this time is conveniently set to its stacking mode, and its transfer mechanism is positioned to remove cards from the drum and deposit them in the station.

The cards from the station 10 may now be controllably fed to the peripheral surface of the transport drum 16, and such cards may be transported by the drum in succession past the transducing means 13 for processing. After processing of the cards by the transducing means 13, they may be deposited in the station 12. At the completion of this operation, the operational modes of the stations 10 and 12 may be reversed so that the cards may be returned in their original order from the station 12 to the station 10. The cards may be further processed by the transducing means 14 as they are being returned to the station 10, if such further processing is desired.

The apparatus of Figure 1 illustrates merely an operational application of the improved feeding-stacking station of the present invention. The apparatus of the invention includes in the station 10 a rotatable assist wheel 50 which rotates in a counterclockwise direction in the view of Figure 1. This rotatable assist wheel is suspended in a manner to be described over the feed head 18 adjacent the leading guide rail 32 of the station. The assist wheel 50 is rotatable about a vertical axis, and its peripheral rim protrudes into the station 10. The rim of the wheel is adapted to frictionally engage the trailing edges of the cards fed into the station when the station is in its stacking mode and fed out of the station when the station is in its feeding mode.

In the illustrated operational mode, and as mentioned above, the station 10 is set to its feeding mode of operation. In this mode, the feed head 18 is moved forward to its operational position, and as described above, the surface 18′ of the feed head engages the trailing portion of the face of the leading card in the station when the feed head is so positioned to its operational location. The arrangement is such that the feed head in its operational position holds the cards in the station at a desired angle to the periphery of the drum 16. This angle is such that the cards may be fed in a one-by-one sequence through the feed throat at the end of the guide rail 34 and out of the station and onto the periphery of the drum.

When the feed head 18 is in the position illustrated in Figure 1, it holds the cards with the illustrated inclination to the periphery of the drum 16, and with the leading edges of the cards bearing against the surface of the guide rail 34. The assist wheel 50 is positioned to engage the trailing edges of the leading cards, when they are held in the illustrated position by the feed head, and to riffle the leading cards in the described manner. Then, as the cards are controllably released by the feed head, they pass through the throat between the guide rail 34 and the periphery of the drum 16, and onto the periphery of the drum.

A similar assist wheel 52 is positioned adjacent the leading guide rail of the station 12. The wheel 52 is also rotatably mounted about a vertical axis for counterclockwise rotation as viewed in Figure 1. The wheel 52 may be suspended in a similar manner to the suspension of the wheel 50, the wheel 52 being so suspended over the feed head 18a.

The rotatable wheel 52 and the wheel 50 are preferably knurled. The wheel 52 is positioned adjacent the mouth of the station 12, and a portion of the periphery of the wheel protrudes into the station. The wheel 52 is adapted to frictionally engage the trailing edges of the cards deposited in the station 12 by the stack head 20a.

In its illustrated stacking mode, the station 12 is conditioned to receive cards from the periphery of the drum 16. To execute this, the stack head 20a is moved forward to its stacking position, and the feed head 18a is moved back to its stand-by position. As each card is deposited in the station 12, under the joint action of the stack head 20a and the pick-off 22a, the trailing edge of each such card is engaged by the periphery of the assist wheel 52. This causes the trailing portions of the cards to be moved and held away from the periphery of the drum 16, as the cards are deposited in the station 12.

Both the assist wheels 50 and 52 are positioned with respect to the mouths of their corresponding stations to be properly located for performing their assist function when either of the stations is conditioned to a feeding mode. Then, and as will be described in more detail subsequently, when either of the stack heads 20 or 20a is moved to its operative position, the forward end of the moved stack head protrudes into the station beyond the inner surface of the corresponding guide rails, such as the guide rail 34 of the station 10. This causes the leading cards in the station to be shifted over towards the assist wheel, so that the assist wheel may properly perform its anti-jam function when the station is in its stacking mode. The stack heads may so protrude into their corresponding stations by 50/1000 of an inch, for example. It will be appreciated, that this construction enable the assist wheel to perform properly in each station when the station is in the stacking mode and when it is in the feeding mode, and it accomplishes this without the need to shift the axis of rotation of the assist wheel when the station is changed from one mode to the other.

The station 10 includes a pusher member 54 which is spring biased by a coil spring 56 toward the mouth of the station. This pusher maintains the cards in a stacked condition within the station, and it serves to hold the stack of cards biased forwardly in the station with the leading card being urged against the periphery of the drum 16. The station 12 includes a similar pusher member 58, and this latter pusher is spring biased towards the mouth of the station 12 by a coil spring 60.

The pusher 58 holds the cards in a stacked condition in the station 12. The inclusion of the rotatable assist wheel 52 serves to maintain at least the leading cards in the station at an angle to the periphery of the drum 16. As described above, without the assist wheel 52, there is a tendency for the cards in the station to be moved by the pusher 60 against the periphery of the drum 16, and this has a tendency to prevent succeesding cards from reaching the stack head 20a. Instead, these succeeding cards are arrested by the force of the preceding cards against the periphery of the drum, and they are so arrested in a position displaced from the mouth of the station. This, as mentioned above, can result in a condition which becomes aggravated so as to cause a jamming at the mouth of the station 12.

The inclusion of the rotatable assist wheel 52 at the mouth of the station 12 serves to hold the trailing edges of the cards in the station 12 back from the periphery of the drum 16. This maintains the area clear for the succeeding cards transported by the drum to the station. That is, each card on the drum 16 reaching the mouth of the station 12 has an unimpeded path to the stack head 20a so that each card may be properly deposited in the station.

As also mentioned above, the stack head *20a* moves its leading edge into the station beyond the confines of the adjacent guide rail, so that the leading cards are shifted towards the assist wheel 52. This shifting of the cards enables the assist wheel 52 properly to perform its intended function, when the station is in the stacking mode, and it also permits the wheel to perform its required function when the station is set to the feeding condition.

The use of the rotatable assist wheels 50 and 52 permits a relatively large number of cards to be fed at relatively high speeds into the stations 10 or 12. When the station 10 is in its stacking mode, the rotatable assist wheel 52 serves the same function as the wheel 52 in the station 12 to enable a large number of cards to be rapidly fed into the station 10 and without the tendency for the cards to jam at the mouth of the station. The stack head 20, like the stack head *20a*, moves in beyond the confines of the guide rail 34 when the station 10 is in its stacking mode. This causes the leading cards in the station to be moved against the assist wheel 50, so that the assist wheel 50 can properly perform its anti-jam function.

As more clearly shown in Figure 2, the feeding-stacking station 10 includes the guide rails 32 and 34 referred to above. These guide rails are mounted in spaced and parallel relationship on the table top 11, and they extend outwardly and away from the drum 16. The guide rails are spaced apart a distance corresponding to the lengths of the cards to be stacked in the station, and they serve to support the cards in an upright stacked condition, with the lower edges of the cards resting on the floor of the station. As illustrated in Figure 1, for example, the pusher members 54 and 58 serve to hold the cards in the stacker relationship between the guide rails of the respective stations.

The leading end of the guide rail 34 has a central tongue-shaped portion 35 (Figure 2) which extends outwardly from the guide rail and into contiguous relationship with the periphery of the drum 16 to form the feed throat for the station 10, this feed throat being referred to above. As mentioned previously, the width of the feed throat is made slightly greater than the thickness of the individual cards so that one card at a time only can pass through the feed throat to the periphery of the drum 16. Then, the controlled interruption of the vacuum pressure at the surface 18' of the feed head 18 causes a single card only to pass from the station 10 to the periphery of the drum 16. Moreover, when the vacuum pressure at the feed head is interrupted for a considerable time interval, the cards from the station 10 are fed in a one-by-one sequence through the feed throat and onto the periphery of the drum.

Figure 3:
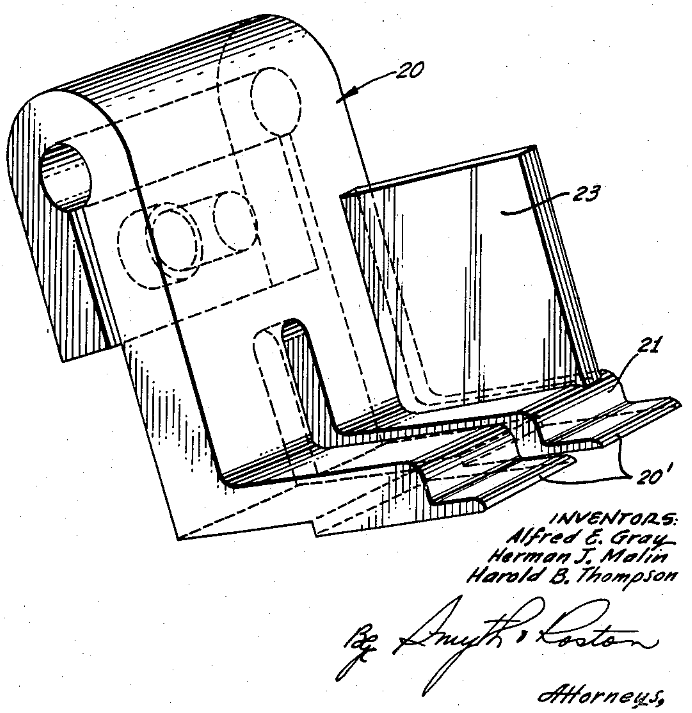

The stack head 20, as illustrated more clearly in Figures 2 and 3, has an intermediate slot formed in it, this slot extending inwardly and upwardly from the fingers 20' of the stack head. The fingers 20', as mentioned above, are adapted to extend into corresponding peripheral grooves in the drum 16 so that the stack head may be brought into intimate contiguous relationship with the drum, when the stack head is moved to its operational position.

The stack head 20 is mounted in a manner to be described to be movable in a slot 42 (Figure 1) in the table top 11 from its stand-by position to its operative position. Upon such motion of the stack head 20, the tongue 35 moves into the central slot in the stack head. When the stack head 20 is moved into place in its operative position, its face 21 moves beyond the inner surface of the guide rail 34 by a predetermined distance. The face 21 bears against the leading cards in the station as cards are deposited in the station, and causes the cards to be shifted against the assist wheel 50. This permits the assist wheel to be close enough to the trailing edges of the cards properly to perform its intended function, as described above.

The stack head 20 also has a ramp 23 secured to its body portion, for example by welding, or the ramp may be made integral with the stack head. The leading edge of the ramp 23 is aligned with the face 21 of the stack head. With this construction, and when the stack head is moved forward to its operational position, the leading edge of the ramp 23 also extends slightly into the station 10 beyond the inner surface of the guide rail 34. The leading edge of the ramp 23 serves as a guide from the face 21 of the stack head so that the cards may be smoothly guided from their displaced position adjacent the face 21 of the stack head, to their normal position adjacent the inner surface of the guide rail 34, as the cards are moved back into the station 10.

The stack head *20a* also has a face *21a* similar to the face 21 of the stack head 20, and it has a ramp *23a* similar to the ramp 23 of the stack head 20. As clearly shown in Figure 1, as the stack head *20a* is moved to its stacking operative position, its face *21a* protrudes slightly into the station 12 to shift the cards over against the assist wheel 52. Then, the leading edge of the ramp *23a* serves as a means to smoothly guide the cards from the face of the stack head to the inner surface of the guide rail as the cards are moved back into the station 12.

It will be clear, therefore, that when the assist wheels 50 and 52 are positioned in their respective stations at individual locations appropriate for performing their individual functions properly when their station is in a feeding mode, such wheels can also be used properly to perform their anti-jamming function when their corresponding stations are in their stacking modes. Moreover, this can be realized without the need of moving either of the wheels, but by the appropriate construction of the corresponding stack heads. Such a construction may be of the type described above, and which serves to shift the leading cards in the stations against their respective assist wheels.

Figure 4:
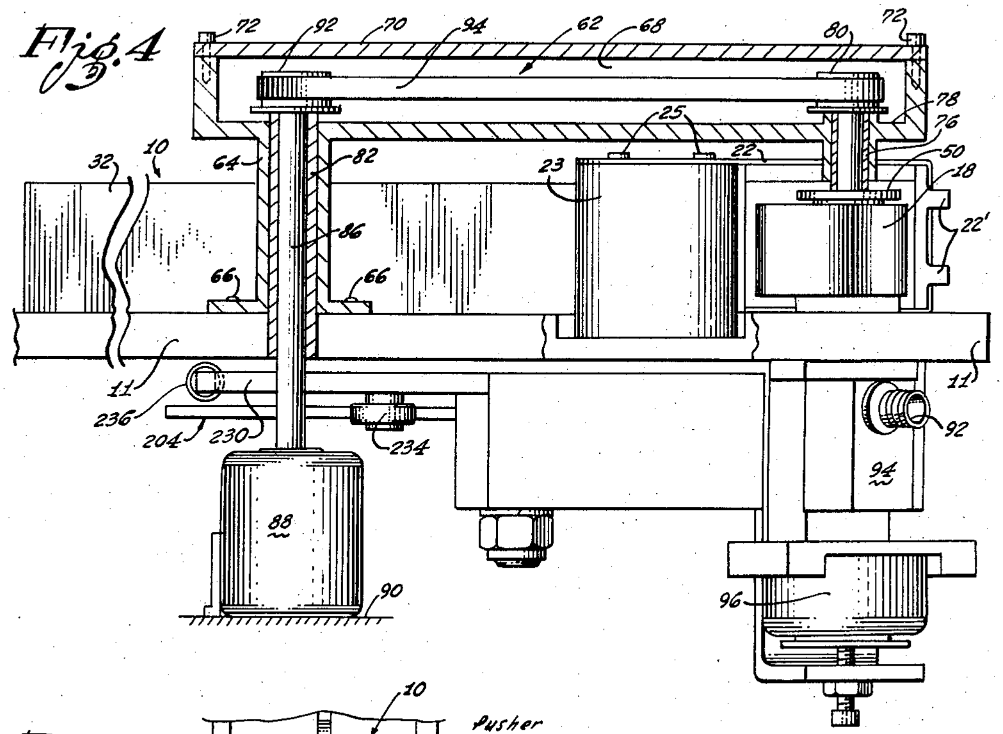
Figure 4 is a side view, partially in section, of the reversible station of Figure 2 and showing the manner in which the rotatable assist wheel may be suspended over a feed head associated with the station, the wheel being so suspended that it may perform its intended function and yet not interfere with the operation of the feed head or other components making up the mechanism of the station.

The perspective view of the station 10 shown in Figure 2, and the partially sectional side view of the station shown in Figure 4, illustrate a particular manner in which the rotatable assist wheel 50 may be mounted without interfering with the normal operation of the reversible mechanism associated with the station. It will be understood, and as mentioned previously, that the assist wheel 52 may be mounted in the same manner in the station 12.

As shown, for example, in Figure 2, the feeding-stacking station 10 includes the guide rail 32 which constitutes its leading wall, and it includes the guide rail 34 which constitutes its trailing wall. The stack head 20 is movable in the described manner in the slot 42 in the table top 11 between its operative and stand-by positions. The guide rail 32 has a bifurcated end portion for receiving the feed head 18. The feed head is movable between its stand-by and operative positions in a slot 38 in the table top 11. The pick-off 22 is mounted on a block 23 adjacent the external surface of the guide rail 32 by means of a pair of screws 25. A housing 62 (Figure 4) is supported on the table top 11 adjacent the guide rail 32 but outside of the station 10. The housing 62 has a tubular vertical portion 64 which is secured to the table top 11 by means, for example, of a pair of screws 66. The housing also includes a horizontal portion 68 which extends across the top of the block 23, and over the pick-off 22 and the feed head 18.

The horizontal portion 68 of the housing 62 has a cover 70 which is secured to the housing by screws such as the screws 72. The forward end of the horizontal portion 68 is integral with a second tubular vertical portion 74. A cylindrical bearing 76 is supported in the tubular portion 74, and a shaft 78 is rotatably mounted in that bearing. The wheel 50 is keyed to the lower end of the shaft 78, and a pulley 80 is keyed to the upper end of that shaft. The pulley is disposed in the horizontal portion 68 of the housing 62.

As stated above, the assist wheel 50 is preferably knurled; and it may be composed of a material, such as rubber, so that it may frictionally engage the trailing ends of the cards which enter the station 10 in the manner described above. The assist wheel 50 is held by the housing 62 so that it is disposed in a horizontal plane over the path of the feed head 18, and with a portion of the periphery of the wheel extending through the bifurcated end portion of the guide rail 32 into the mouth of the station 10.

A cylindrical bearing 82 is disposed in the tubular vertical portion 64 of the housing 62, and a tubular bearing 84 is mounted in an aperture in the table top 11 in axial alignment with the bearing 82. A vertical drive shaft 86 extends upwardly through the bearings 82 and 84, and this shaft is driven by a motor 88. The motor 88 is mounted on any appropriate supporting surface or bracket 90 under the table top 11.

A pulley 92 is keyed to the upper end of the shaft 86, and this pulley is disposed in the horizontal portion 68 of the housing 62. A drive belt 94 couples the pulley 92 to the pulley 80. The motor 88, therefore, drives the assist wheel 50 through the drive shaft 86, through the belt 94 and through the drive shaft 78. The assist wheel 50 is therefore rotated to perform its intended anti-jam function. The mounting structure for the wheel is such that it does not interfere with the movement of the feed head 18 as the feed head is moved between its stand-by and operative positions.

Also, and as mentioned above, the supporting structure holds the assist wheel 50 in such a position with respect to the mouth of the station 10 that the assist wheel may properly perform its anti-jam function when the station is conditioned to its feeding mode. Moreover, the cards are shifted laterally in the station by the stack head 20 when the station is conditioned for its stacking mode, so that the assist wheel 50 can continue to perform its intended function with optimum efficiency during the stacking mode and without any need to shift the position of the assist wheel.

As noted above, the feed head 18 provides a controllable vacuum pressure at its surface 18'. This vacuum pressure can be produced by means of a suitable vacuum line which is coupled to a nipple 92 in a portion of the feed head which extends under the table top 11. The nipple 92 is connected to a valve assembly 94 which also is disposed under the table top 11, and the valve assembly forms a portion of the mechanism controlling the supply of vacuum pressure to the surface 18' of the feed head. A solenoid actuated valve assembly 96 is associated with the valve assembly 94, and the solenoid valve controls the vacuum pressure at the surface 18'. The actual structural details of the feed head 18 and its associated valve assembly form no part of the present invention. A full description of these details may be found in the above-mentioned copending application Serial No. 645,639 filed March 12, 1957, in the names of Alfred M. Nelson and Allan Orner.

In a constructed embodiment of the invention, the assist wheels 50 and 52 were provided with a diameter of 1⅛ inches, and these wheels are rotated at a speed of 47 r.p.m.

Details of the vacuum transport drum 16 are shown in Figure 5. As noted above, this drum is similar in its construction to the drum disclosed and claimed in copending application Serial No. 600,975 which was filed July 30, 1956, in the name of Loren R. Wilson.

As shown in Figure 5, the vacuum transport drum 16 is made up of a lower section and an upper section. The lower section includes a disc-like bottom surface 118 and an annular side portion 120 integral with one another. A pair of axially spaced peripheral orifices 122 and 124 extend through the side portion 120. Each of these orifices is discontinuous in that it is interrupted at selected intervals about its periphery by ribs 126 integral with the side portion 120. The orifices have respective external peripheral annular channels associated with each of them, and fingers such as the fingers 22' (Figure 2) of the pick-off 22 and the fingers 20' of the stack head 20 extend into these channels. This engagement of the fingers 20' and 22' with the annular channels or grooves in the periphery of the transport drum 16 permits the cards to be removed from the periphery of the drum and deposited in either of the stations in the described manner, when the particular stations are in their stacking mode.

The disc-like bottom portion 118 of the lower section of the drum is undercut, as shown at 128. This is so that the end of this portion will have a reduced diameter with respect to the outer diameter of the annular side portion 120. This enables the edge of the table top 11 to extend beyond the outer limits of the side portion 120. Therefore, even without excessively close tolerances between the edge of the table top 11 and the rotating surface of the drum 16, the cards supported endwise on the table top in the station 10 or in the station 12 have no tendency to slip down between the table and the drum to become misplaced and damaged.

The upper section of the drum 16 is in the form of a disc-like member 130 which engages the annular side portion 120 of the lower section. The upper section 130 forms an enclosure with the lower section of the drum, with the upper section being parallel to the disc-shaped bottom portion 118 of the lower section. The upper section 130 of the drum is held in place on the side portion 120 by a plurality of screws 132.

When one of the cards is fed from the feeding-stacking station 10 to the periphery of the drum 16 in the manner described above, such a card is held on the outer peripheral surface of the annular side portion 120 by vacuum pressure. This vacuum pressure is created at the peripheral surface of the drum in a manner to be described.

A deflector ring 140 is supported within the interior of the drum 16 in press fit within the inner surface of the annular side portion 120. This deflector ring is tapered towards the center of the drum to prevent turbulence and to provide a streamlined path for air which is drawn in through the orifices 122 and 124.

The portion 118 of the lower section of the drum contains a central opening which is surrounded by an annular collar 141. The collar 141 surrounds a shoulder 142 provided at one end of a hollow shaft 144. The drum 16 is supported on the shoulder 142, and one end of the shaft 144 extends into the opening in the portion 118, with the shaft being disposed in friction fit with that portion. Therefore, rotation of the hollow shaft 144 causes the drum 16 to rotate. Also, the interior of the hollow shaft 144 communicates with the interior of the drum 16.

Bearings 146 are provided at opposite ends of the shaft 144. The inner races of these bearings are mounted on the shaft 144, and their outer races are disposed against bushings 148. The bushings are secured to a housing 150 by respective ones of a plurality of studs 152. An arcuate opening 156 is provided in the housing 150 between the bearings 146. This opening enables a drive belt 158 to extend into the housing and around a pulley 160. The pulley 160 is keyed to the shaft 144 between the bearings 146, and the pulley is against axial movement by a pair of sleeves 162 disposed on opposite sides of the pulley. In this manner, the shaft 144 and the drum 16 can be rotated by a suitable motor (not shown), the motor being coupled to the pulley 160 by means of the drive belt 158.

The bearings 146 and the sleeves 162 are held on the shaft 144 by a nut 166. The nut 166 is screwed on a threaded portion at the bottom of the shaft, and a lock washer 164 is interposed between the nut and the lower bearing. A sealing disc 168 is also screwed on the threaded portion at the bottom of the shaft 144. The sealing disc 168 operates in conjunction with a bottom plate 170 to inhibit the movement of air between the interior of the housing 150 and the interior of the hollow shaft 144 when a pressure differential exists between the housing and the shaft.

The bottom plate 170 is secured to the housing 150 by a plurality of studs 172, and it has a central circular opening. A hollow conduit 174 extends into the opening in friction fit with the plate 170. The conduit 174 is axially aligned with the hollow shaft 144 so that air may be exhausted from the hollow interiors of the shaft and the conduit by a vacuum pump 176. The vacuum pump may be of any suitable known construction and, for that reason, it is shown merely in block form.

The vacuum pump 176 draws air in through the orifices 122 and 124 and through the interior of the drum 16 down the shaft 144 and through the conduit 174. This creates the desired vacuum pressure at the outer peripheral surface of the annular portion 120 of the lower section of the drum 16. The vacuum pressure that is so created around the outer surface of the annular portion 120 of the drum serves firmly to retain the cards on that surface as they are transported by the drum.

As noted above, the feed head 18 and the stack head 20 associated with the station 10 are controlled so that when the feed head is brought to its operative position, the stack head is retracted to its stand-by position, and vice versa. As also noted, a similar control is provided for the feed head **18*a* and the stack head 20*a* associated with the station 12. Figures 6 and 7 show a suitable cam control for the feed head 18 and the stack head 20. It will be understood that a similar control can be used for the feed head 18*a* and the stack head 20*a* associated with the station 12**.

As shown in Figures 6 and 7, a cam 204 for the heads 18 and 20 is fixed to a cam shaft 206. The cam shaft 206 extends along a vertical axis, so that the cam is rotatable on the underside of the table top 11. A suitable sprocket wheel (not shown) is also keyed to the cam shaft 206, and this sprocket wheel receives a chain drive which couples the cam shaft to a suitable driving mechanism. In this manner, a suitable rotation can be imparted to the cam shaft 206 and to the cam 204. The driving mechanism, may be controlled in a manner, for example, such as described in detail in the copending application Ser. No. 645,639 filed March 12, 1957 referred to above. This mechanism is so designed that the cam 204 is rotated through 180 degrees during the time the source is energized.

A lever arm 224 is pivotally mounted on the under side of the table top 11 on a pivot shaft 226. The stack head 20 is mounted on one end of this lever arm by means of a screw 227 for movement in the slot 42 in the table top. A cam follower 228 is rotatably mounted on the lever arm 224 at an intermediate point on the arm between the pivot shaft 226 and the end of the arm remote from the screw 227 which supports the stack head.

A second lever arm 230 is pivotally mounted on a pivot shaft 232 at the other side of the cam 204. This second lever arm is also mounted on the under side of the table top 11, and the pivot shaft 232, like the pivot shaft 226, extends upwardly through the table top. The lever arm 230 has a cam follower 234 rotatably mounted at an intermediate point on the arm between the pivot shaft 232 and the upper end of the lever arm in Figures 6 and 7. The feed head 18 is mounted on the lower end of the lever arm 230 in Figures 6 and 7 for movement in the slot 28 in the table top 11.

A coil spring 236 is coupled between the ends of the lever arms 224 and 230, and this spring biases the cam followers 238 and 234 against the peripheral edge of the cam 204. The cam 204 is shaped so that in one angular position, as shown in Figure 7, it moves the lower end of the lever arm 224 and the stack head 225 to the left in the slot 42 in Figure 5, and at the same time the cam moves the lower end of the lever arm 230 and the feed head 18 to the left in the slot 38. In a second angular position of the cam 204, as shown in Figure 6, the cam is shaped to move the lower end of the arm 228 and the stack head 20 to the right in the slot 42 and the lower end of the arm 230 and the feed head 18 to the right in the slot 38.

That is, the view of Figure 6 shows the cam in the position in which the stack head is moved forwardly to its operative position and the feed head is retracted to its stand-by position. Conversely, the view of Figure 7 shows the cam 204 in position to retract the stack head 20 to its stand-by position and to move the feed head 18 forward to its operative position. As noted above, the driving mechanism for the cam 204 may be controlled in the manner described in copending application Serial No. 645,639 so that successive actuations of the driving mechanism causes the transfer mechanism associated with the station 10 alternately to assume the position of Figure 6 and the position of Figure 7.

The action of the assist wheel 50 in preventing jamming at the mouth of the station 10 when the station is in its stacking mode and when it is in its feeding mode may best be understood by a consideration of the fragmentary views of Figures 8 and 9. It will be understood, of course, that the assist wheel 52 performs the same function in conjunction with the station 12.

As noted above, the fragmentary view of Figure 8 represents the station 10 in its stacking mode. In that mode, the stack head 20 is moved against the drum 16, and the portion 21 of the stack head, together with the leading edge of the ramp 23, extend into the station beyond the inner surface of the guide rail 34. It will be observed from the view of Figure 8 that the portion 21 of the stack head moves the leading cards to the left in Figure 8 as the stack head is brought fully into its operative position. Then, as the cards are deposited from the drum 16 into the station 10, they move back in the station and are guided smoothly along the edge of the ramp 23 into position with their leading edges adjacent the inner surface of the guide rail 34.

Therefore, when the station is in the stacking mode of Figure 8, the leading cards are moved by the stack head 20 and its ramp 23 to the left in Figure 8 and against the periphery of the assist wheel 50. The assist wheel 50 is rotated in a counter-clockwise direction, as noted above, and its peripheral surface engages the edges of the cards in the station to hold the cards at an angle to the periphery of the drum.

The pusher member 54 described in conjunction with Figure 1 normally exerts a pressure on the cards along an axis substantially as indicated by the arrow in Figure 8. This pressure normally is exerted at approximately the tangent point of the leading card with the periphery of the drum. However, as more and more cards are fed into the station 10, the axis at which the pressure is exerted tends to move to the left in Figure 8. This means that there is a tendency for succeeding cards to be arrested, by the pressure of the cards already in the station, at a position at which the subsequent cards are displaced to the left of the mouth of the station. This may create an aggravated jamming condition, as described above.

However, the action of the assist wheel 50 continually moves the trailing edges of the cards away from the periphery of the drum 16 and holds the pressure point to the right in Figure 8. This means that even though there are a relatively large number of cards in the station, each subsequent card still has a relatively unimpeded path to the stack head 20. Therefore, such cards are carried by the drum 16 all the way to the surface 21 of the stack head into alignment with the mouth of the station 10. This permits the cards to be deposited into the station without jamming.

As noted previously, when the station 10 is conditioned to the feeding mode, as illustrated in Figure 9, it is necessary for the relative positions of the wheel 50 and of the leading cards in the station 10 to be changed. It has been found, that if the relative positions were to remain as they were in the stacking mode, the cards would not be free to leave the station but would be jammed against the rail 34. Conversely, if the relative positions were held to that appropriate for the feeding mode, it has been found that the assist wheel 50 will not properly perform its anti-jam function in the stacking mode. This problem is overcome by the construction of the present invention. As illustrated in Figure 9, when the feed head 20 is retracted to its stand-by position, the leading cards are again free to move slightly to the right in Figure 9 and against the inner surface of the guide rail 34. This adjusts the relative positions of the cards and the assist wheel 50 to the proper setting to enable the assist wheel to control the position of the cards for the feeding mode. In this latter mode, and as mentioned above, the assist wheel 50 serves to riffle the cards and prevent sticking, and it also serves to hold the cards at a proper angle to permit the one-by-one feed of the cards through the feed throat of the station.

The invention provides, therefore, an improved feeding-stacking station for use in card processing apparatus. The improved station of the invention incorporates a rotatable assist wheel at its mouth. The station also incorporates a stack head assembly which controls the relative positions of the cards and the assist wheel. This control is such that the cards have a first position for the feeding mode and a second position for the stacking mode. These positions are so designed that optimum anti-jam action is realized by the assist wheel for both modes of operation of the station. Moreover, this optimum efficiency is achieved by means of a relatively simple expedient and by the requirement of a minimum of extraneous equipment.

The improved apparatus of the present invention permits cards to be fed to different stations in the type of card processing apparatus under consideration, and this feed may proceed at a relatively high rate of speed. In addition, the improved and simplified construction of the present invention permits a relatively large number of cards to be fed into and out of the different stations constructed in accordance with the concepts of the present invention.

It should be appreciated that other types of transport means than drums may be used to obtain a movement of the cards and that the transport means may be stationary or movable. It should also be appreciated that the term "cards" as used in the specification and in the claims is intended to cover any type of discrete elements capable of recording and subsequently reproducing bits of information.

What is claimed is:

1. In apparatus for processing data on a plurality of information storage cards and including transport means for the cards, a station constructed to hold the cards in stacked relationship and disposed relative to the transport means to obtain a controlled transfer of cards between the station and the transport means, a feed head movable between operative and stand-by positions and disposed in the operative position in coupled relationship to the cards in the card holder to obtain a controlled transfer of cards from the station to the transport means, means including an assist member disposed in coupled relationship to the cards in the station and movable in a direction to position the cards in the station for facilitating the transfer of cards between the transport means and the station, the assist member being disposed relative to the feed head in the operative position of the feed head to obtain a first lateral disposition of the cards in the station, and a stack head movable between operative and stand-by positions and disposed in the operative position in coupled relationship to the cards on the transport means to obtain a controlled transfer of cards from the transport means into the station and disposed in the operative position in coupled relationship to the cards in the station to obtain a second lateral disposition of the cards in the station relative to the assist member for facilitating the transfer of cards into the station wherein the second lateral disposition of the cards in the station is different from the first lateral disposition.

2. Apparatus as set forth in claim 1 in which means are operatively coupled to the feed head and the stack head to obtain a synchronous movement of the feed head to the standby position and the stack head to the operative position at particular times and to obtain a synchronous movement of the feed head to the operative position and the stack head to the stand-by position at other times.

3. In apparatus for processing data on a plurality of information storage cards and including transport means for the cards, a station constructed to hold the cards in stacked relationship and disposed relative to the transport means to obtain a controlled transfer of cards between the station and the transport means, a feed head movable between stand-by and operative positions and disposed in the operative position in coupled relationship to the cards in the station to obtain a controlled transfer of cards from the station to the transport means, a stack head movable between stand-by and operative positions and disposed in the operative position in cooperative relationship with the cards on the transport means to obtain a controlled transfer of cards from the transport means into the station and further disposed in the operative position in protruding relationship into the station relative to the disposition of the feed head in the operative position and in abutting relationship to the lateral edges of the leading cards in the station to obtain a different disposition of the cards in the station for the operative position of the stack head than for the operative position of the feed head, and means including an assist member disposed in coupled relationship to the cards in the station for exerting a force on the cards in a direction to facilitate a transfer of cards from the transport means into the station in the operative position of the stack head and a transfer of cards from the station to the transport means in the operative position of the feed head.

4. Apparatus as set forth in claim 3 in which means are operatively coupled to the feed head and to the stack head to obtain a synchronous movement of the feed head to the operative position and the stack head to the stand-by position at particular times and to obtain a synchronous movement of the feed head to the stand-by position, and the stack head to the operative position at other times and in which a ramp is included on the stack head to produce the abutting relationship between the stack head and the lateral edges of the leading cards in the station in the operative position of the stack head and to facilitate the movement of the cards from the transport means into the station in the operative position of the stack head.

5. In apparatus for processing data on a plurality of information storage cards and including transport means for the cards, a station constructed to hold the cards in stacked relationship and disposed relative to the transport means to obtain a controlled transfer of cards between the station and the transport means, a feed head disposed in one position in cooperative relationship with the cards in the station at the trailing ends of the cards to obtain a controlled transfer of cards from the station and disposed in a second position out of cooperative relationship with the cards, an assist member disposed in cooperative relationship with the cards in the station at the trailing ends of the cards and operative to exert a force on the trailing ends of the cards to facilitate a transfer of the cards from the transport means to the station, and a stack head disposed in a first position partially within the station in abutting relationship to the leading ends of the leading cards in the station and in cooperative relationship with the leading cards in the station to provide a lateral positioning of the cards against the assist member for facilitating the transfer of cards into the station, the stack head being disposed in the first position in cooperative relationship with the cards on the transport means to obtain a controlled transfer of the cards from the transport means into the station and being disposed in a second position out of cooperative relationship with the cards on the transport means and in the station.

6. The apparatus as set forth in claim 5 in which means are operatively coupled to the feed head and to the stack head to obtain a movement of the feed head to the first position and a simultaneous movement of the stack head to the second position and to obtain a movement of the stack head to the first position and a simultaneous movement of the feed head to the second position, and in which the transport means is movable in a closed loop.

7. In apparatus for processing data on a plurality of information storage cards and including transporting means for the cards, the combination of: a feeding-stacking station for holding the cards in a stacked condition and having a mouth disposed adjacent the transporting means, control means disposed in cooperative relationship with the station for establishing said station to a feeding mode to cause cards to be fed therefrom to the transporting means and for establishing said station to a stacking mode to cause cards to be deposited therein from the transporting means, movable assist means disposed in cooperative relationship with the cards in the station for engaging the trailing edges of the cards as the same are moved to the mouth of the station by the transport means when the station is in its stacking mode and for engaging the trailing edges of the leading cards in the station when the station is in its feeding mode, said assist means being movable in a direction to cause the trailing ends of the cards engaged thereby to be moved in a direction from the transport means to facilitate the transfer of cards between the transport means and the station in the feeding and stacking modes, and means in cluding in the control means for engaging at least the leading cards in the station when the station is in its stacking mode to cause the cards to be displaced laterally across the mouth of the station in the direction of the assist means to obtain a first positioning of the leading cards in the station with respect to the assist means in the feeding mode and a different positioning of the leading cards in the station with respect to the assist means in the stacking mode.

8. In apparatus for processing data on a plurality of information storage cards and including transport means for the cards, the combination of: a feeding-stacking station for the cards and having a mouth disposed adjacent the transport means and including a supporting surface for the cards and a pair of spaced guide rails, the cards in the station being supported in a stacked condition between the guide rails with edges thereof resting on the supporting surface, stacking means coupled to the cards on the transport means in the stacking mode and disposed in cooperative relationship with the station for obtaining a transfer of cards into the station from the transport means when the station is conditioned to a stacking mode of operation, feeding means coupled to the cards in the station for obtaining a controlled transfer of cards from the station when the station is conditioned to a feeding mode of operation, rotatable assist means disposed in coupled relationship to the cards in the station for engaging the trailing ends of the cards in a direction to facilitate the transfer of cards between the transport means and the station, means coupled to the assist means for imparting rotational motion to the assist means in a direction to cause the trailing ends of the cards engaged thereby to be moved in a direction away from the transport means, and means coupled to the stacking means for moving the stacking means into a position within the station in the stacking mode and into abutting relationship with the lateral edges of the leading cards in the station to obtain a first positioning of the leading cards in the station with respect to the assist means in the feeding mode and a second position of the leading cards in the station with respect to the assist in the stacking mode.

9. In apparatus for processing data on a plurality of information storage cards and including transport means for the cards, the combination of: a feeding-stacking station for the cards and having a mouth disposed adjacent the transport means and including a supporting surface for the cards and a pair of spaced guide rails, the card being supported in the station in a stacked condition between the guide rails with their lower edges resting on the supporting surface, stacking means movable from a stand-by position to an operative position within the station in coupled relationship to the cards on the transport means and in cooperative relationship with the station for causing cards to be removed from the transporting means and deposited into the station when the station is in a stacking mode of operation, feeding means movable from a stand-by position to an operative position in coupled relationship to the cards in the station for obtaining a controlled feed of cards from the station to the transport means when the station is in a feeding mode of operation, assist means coupled to the cards in the station for engaging the trailing ends of the leading cards in the station to draw the trailing ends of the leading cards away from the transporting means and maintain at least the leading cards in the station at an angle to the transporting means, and means mechanically coupled to the stack head for moving the stack head to a position within the station in the operative position to obtain a displacement of at least the leading cards in the station in the direction of the assist means relative to the positioning of the cards in the operative position of the feed head.

10. In apparatus for processing data on a plurality of information storage cards and which includes transporting means for the cards, the combination of: a feeding-stacking station for the cards and having a mouth disposed adjacent the transporting means and including first and second spaced guide rails and a supporting surface for the cards, the cards being held in the station in a stacked condition between the guide rails with the lower edges thereof resting on the supporting surface, a stack head positioned adjacent the first guide rail and movable from a stand-by position to an operative position within the station for causing the cards to be transferred from the transport means into the station when the station is in a stacking mode of operation, a feed head positioned adjacent the second guide rail and movable from a stand-by position to an operative position for obtaining a controlled transfer of the cards from the station to the transport means when the station is in a feeding mode of operation, a rotatable assist wheel disposed adjacent the second guide rail for engaging the trailing edges of the cards in the feeding and stacking modes, means coupled to the assist wheel for imparting rotational motion to the assist wheel in a direction to cause the trailing ends of the cards engaged thereby to be moved in a direction away from the transporting means for facilitating the transfer of cards between the transport means and the station, and means affixed to the stack head for engaging the leading cards in the station when the station is in its stacking mode to cause the same to be displaced laterally across the mouth of the station in the direction of the assist wheel so that the leading cards in the station may have a first position with respect to the assist wheel when the station is in its feeding mode and a different position with respect to the assist wheel when the station is in its stacking mode.

11. In apparatus for processing data on a plurality of information storage cards and including transport means for the cards, the combination of: a feeding-stacking station for the cards and having a mouth disposed adjacent the transporting means and including first and second spaced guide rails and a supporting surface for the cards, the cards being held in the station in a stacked relationship between the guide rails with the lower edges of the cards resting on the supporting surface, a stack head positioned adjacent the first guide rail and movable from a stand-by position to an operative position within the station for causing the cards to be transferred from the transport means into the station when the station is in a stacking mode, a feed head positioned adjacent the second guide rail and movable from a stand-by position to an operative position for controlling the sequential feed of the cards from the station to the transport means when the station is in a feeding mode, a rotatable assist wheel disposed adjacent the second guide rail for engaging the trailing edges of the cards in the station, means coupled to the assist wheel for imparting rotational motion to the assist wheel in a direction to cause the trailing ends of the cards engaged thereby to be moved in a direction away from the transport means to facilitate the transfer of cards between the transport means and the station, and means included on the stack head and disposed to protrude into the station beyond the inner surface of the first guide rail when the stack head is moved to its operative position for engaging the forward edges of the leading cards in the station when the station is in its stacking mode to cause such cards to be displaced laterally across the mouth of the station in the direction of the assist wheel so that the leading cards in the station may have a first position with respect to the assist wheel when the station is in its feeding mode and a different position with respect to the assist wheel when the station is in its stacking mode.

12. In apparatus for processing data on a plurality of information storage cards and including transport means for the cards, the combination of: a feeding-stacking station for the cards and having a mouth disposed adjacent the transporting means and including first and second spaced guide rails and a supporting surface for the cards, the cards being held in the station in a stacked condition between the guide rails with their lower edges resting on the supporting surfaces, a stack head positioned adjacent the first guide rail and movable from a stand-by position to an operative position within the station for causing the cards to be deposited from the transport means into the station when the station is in a stacking mode, a feed head positioned adjacent the second guide rail and movable from a stand-by position to an operative position for controlling the sequential feed of the cards from the station to the transporting means when the station is in a feeding mode, a rotatable assist wheel disposed adjacent the second guide rail for engaging the trailing edges of the cards in the station, means coupled to the assist wheel for imparting rotational motion to the assist wheel in a direction to cause the trailing ends of the cards engaged thereby to be moved in a direction away from the transport means to facilitate the transfer of cards between the transport means and the station in the feeding and stacking modes, said first guide rail having a tongue portion at the end thereof of reduced dimensions and with the extremity of the tongue portion forming a feed throat with the transporting means, and said stack head having a slot formed therein to receive the tongue portion when the stack head is moved to its operative position and to obtain a protrusion of a portion of the stack head into the station beyond the first guide rail, said protruding portion of the stack head serving to engage the forward edges of the leading cards in the station when the station is in its stacking mode to cause such cards to be displaced laterally across the mouth of the station in the direction of the assist wheel so that the leading cards in the station may have a first position with respect to the assist wheel when the station is in its feeding mode and a different position with respect to the assist wheel when the station is in its stacking mode.

13. In apparatus for processing data on a plurality of information storage cards and which includes transport means for the cards, the combination of: a feeding-stacking station for the cards and having a mouth disposed adjacent the transporting means and including first and second spaced guide rails and a supporting surface for the cards, the cards being held in the station in a stacked condition between the guide rails with their lower edges resting on the supporting surface, a stack head positioned adjacent the first guide rail and movable from a stand-by position to an operative position within the station for causing the cards to be transferred from the transport means into the station when the station is in a stacking mode, a feed head positioned adjacent the second guide rail and movable from a stand-by position to an operative position for controlling the sequential transfer of cards from the station to the transport means when the station is in a feeding mode, a rotatable assist wheel disposed adjacent the second guide rail for engaging the trailing edges of the cards as the cards are moved to the mouth of the station by the transporting means and caused to be deposited in the station by the stack head when the station is in the stacking mode and for engaging the trailing edges of the leading cards in the station when the station is in the feeding mode, means for imparting rotational motion to the assist wheel in a direction to cause the trailing ends of the cards engaged thereby to be moved in a direction away from the transporting means to facilitate the transfer of cards between the transport means and the station in the feeding and stacking modes, said stack head and said first guide rail having a configuration to obtain a protrusion of a portion of the stack head into the station beyond the inner surface of the first guide rail when the stack head is in its operative position, said protruding portion of the stack head serving to engage the forward edges of the leading cards in the station when the station is in its stacking mode to cause such cards to be displaced laterally across the mouth of the station in the direction of the assist wheel so that the leading cards in the station may have a first position with respect to the assist wheel when the station is in its feeding mode and a different position with respect to the assist wheel when the station is in its stacking mode.

14. The combination defined in claim 12 in which the stack head has a ramp formed thereon in a position to extend into the station beyond the inner surface of the first guide rail adjacent the said portion of the stack head to present a guiding surface for the cards from the protruding portion of the stack head to the inner surface of the first guide rail when the stack head is in its operative position and as the cards are moved back into the station and in which the transport means is movable in a closed loop.

15. The combination defined in claim 13 in which the stack head has a ramp formed thereon in a position to extend into the station beyond the inner surface of the first guide rail adjacent the protruding portion of the stack head when the stack head is in its operative position to present a guiding surface for the cards from the protruding portion of the stack head to the inner surface of the first guide rail as the cards are moved back into the station and in which the transport means is a rotatable drum.

References Cited in the file of this patent

UNITED STATES PATENTS 2,883,188 Gray et al. -------------- Apr. 21, 1959